Jan. 8, 1929.　　　　　　　　　　　　　　1,697,917
C. H. KAVANAGH
FRUIT SIZING DEVICE
Filed June 9, 1927　　　　4 Sheets-Sheet 1

Inventor:
Charles H. Kavanagh,

Jan. 8, 1929.  1,697,917

C. H. KAVANAGH
FRUIT SIZING DEVICE
Filed June 9, 1927 4 Sheets-Sheet 2

Inventor;
Charles H. Kavanagh,
by
Attys.

Jan. 8, 1929.

C. H. KAVANAGH

FRUIT SIZING DEVICE

Filed June 9, 1927    4 Sheets-Sheet 3

1,697,917

Inventor:
Charles H. Kavanagh,
Attys.

Jan. 8, 1929.　　　　　　　　　　　　　　　1,697,917
C. H. KAVANAGH
FRUIT SIZING DEVICE
Filed June 9, 1927　　　　4 Sheets-Sheet 4

Inventor:
Charles H. Kavanagh,

Patented Jan. 8, 1929.

1,697,917

UNITED STATES PATENT OFFICE.

CHARLES H. KAVANAGH, OF LEXINGTON, MASSACHUSETTS.

FRUIT-SIZING DEVICE.

Application filed June 9, 1927. Serial No. 197,571.

This invention relates to fruit sorting or grading means and aims particularly to provide an improved apparatus for sorting apples, and the like, and having, among others, the novel features and advantages herein described. The particular object of the invention is to provide an apparatus that will more surely sort the fruit into the various sizes required without regard to the shape of the fruit, and with less likelihood of injuring the fruit in so doing, and that will sort the fruit more speedily than is now done by any apparatus for that purpose known to me.

Figure 1:
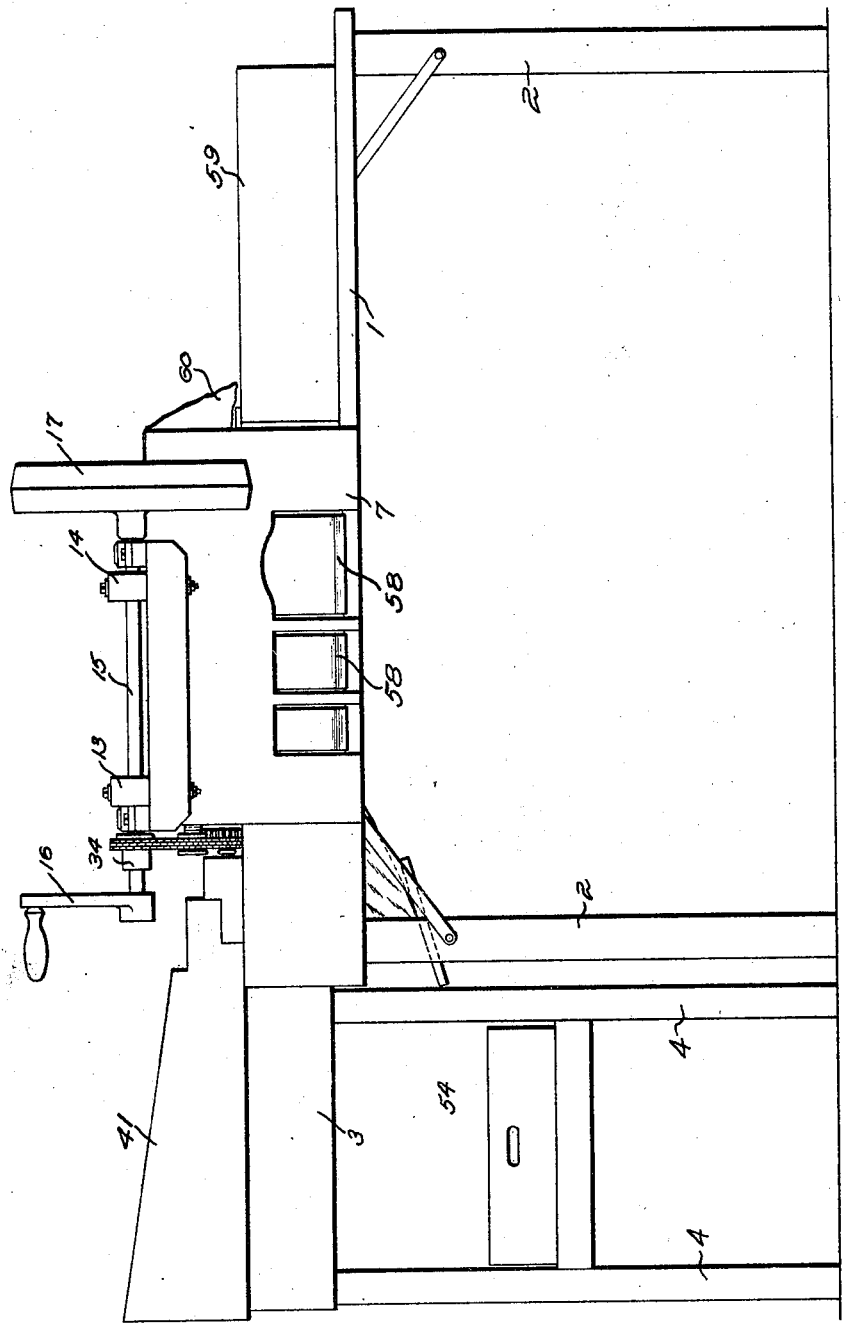
Figure 2:
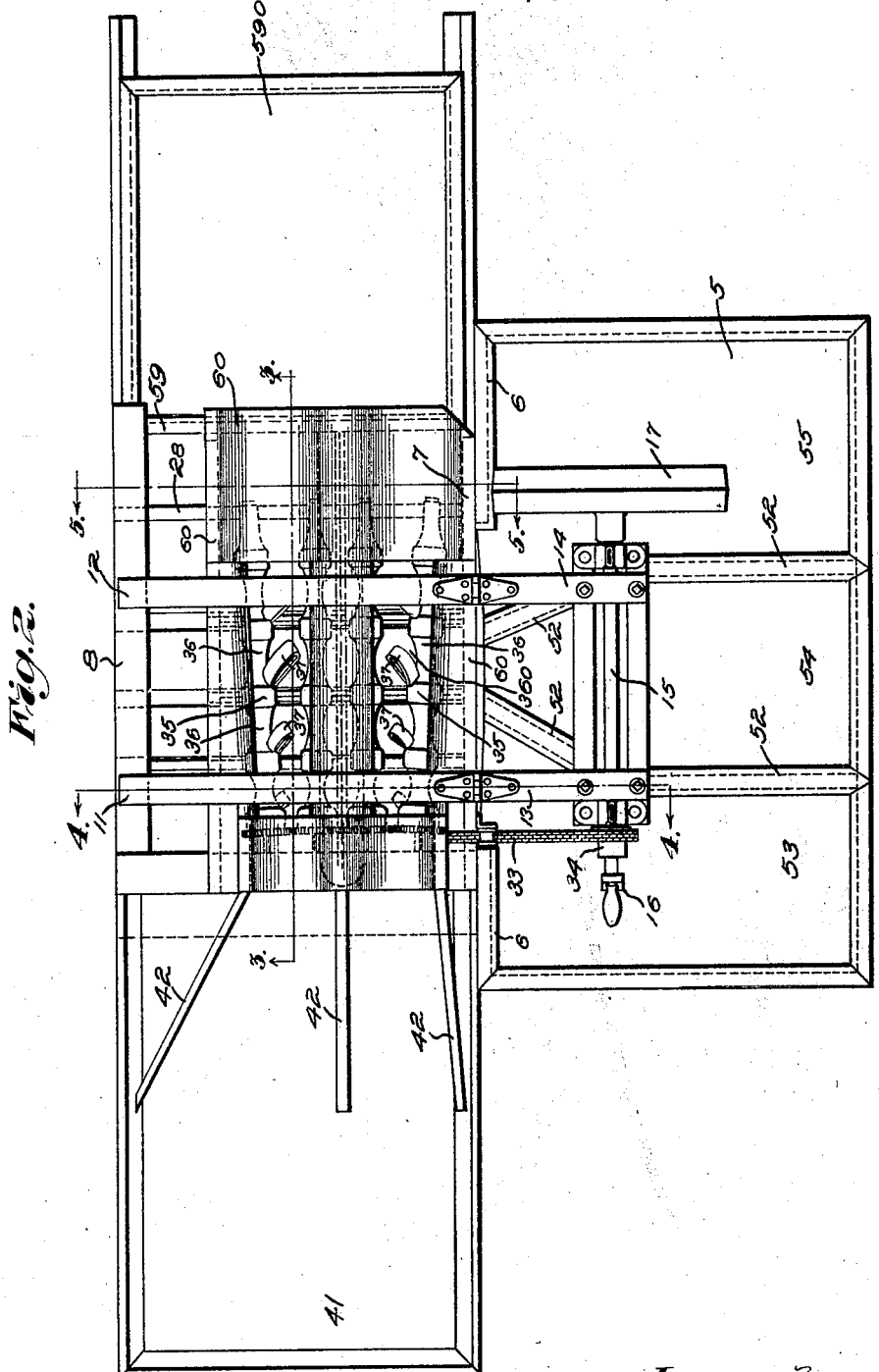
Figure 3:
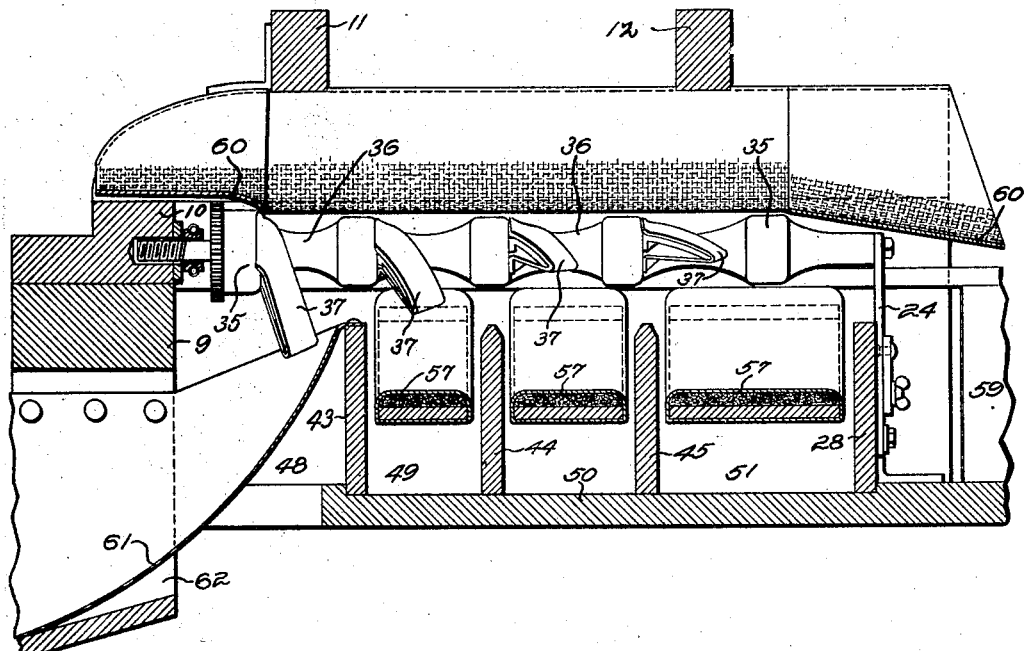
Figure 4:
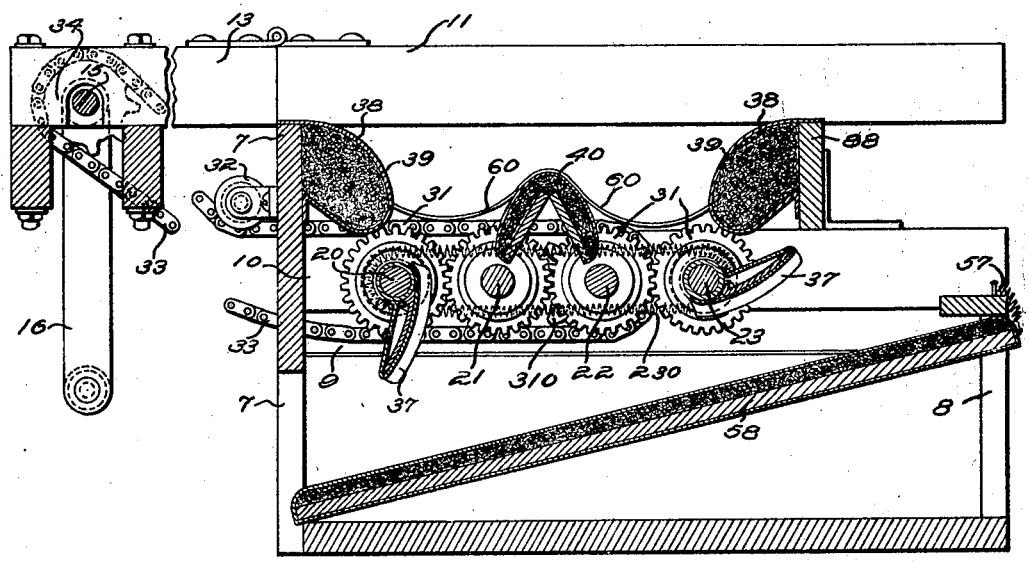
Figure 5:
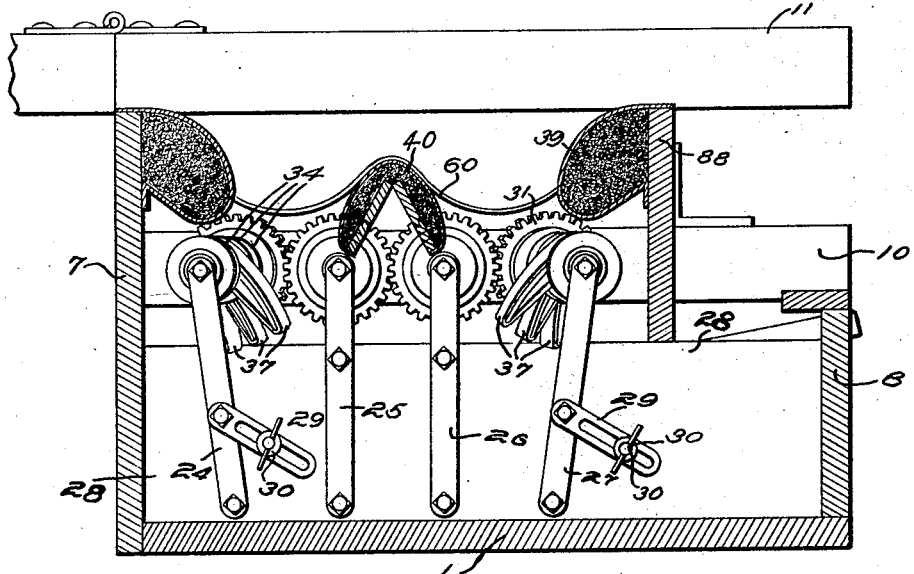

In the embodiment of my invention selected for illustration and description,

Fig. 1 is a front or side elevation with one of the containers removed;

Fig. 2, a plan;

Fig. 3, a partial vertical, longitudinal section on the line 3—3, Fig. 2, looking in the direction of the arrow;

Fig. 4, a vertical cross-section on the line 4—4, Fig. 2, also looking in the direction of the arrow; and Fig. 5, a vertical cross-section on the line 5—5, Fig. 2, from the right.

Referring first to Fig. 1, my novel apparatus comprises a suitable table or stand 1, with legs 2, and a preferably separate stand 3 at the front, or Fig. 1 left hand end, of the table 1 with legs 4, and adapted to be positioned adjacent to that end of the table.

A multi-compartment container 5, Fig. 2, is provided and it may be equipped with legs, not shown, for support, or it may be attached along its rear side 6 to the front of the table 1 by any suitable means, as hooks or brackets, not shown, whichever may be most convenient.

The table 1 is provided, Figs. 1, 2, 4, with upright side members 7, 8, 88, between which extend cross-members 9, 10, 11, one above the other in height, and, Fig. 2 a like member 12, at the same height as member 11, and to the forward ends of the last-named members 11, 12, Fig. 2, are hinged corresponding extension members 13, 14, which overhang the container 5.

At the ends of the members 13, 14, Figs. 1, 2, is mounted a drive shaft 15 provided with a crank 16 for hand operation. The opposite end of the shaft carries a wheel 17 which acts as a fly wheel and also as a pulley over which may be run a belt if desired from any source of power, not shown.

In the member 10, Figs. 3, 4, are journaled one end of each of the shafts 20, 21, 22, 23, their opposite ends, Figs. 2, 3, 5, being journaled in bearing posts 24, 25, 26, 27, secured to the cross bar 28, the two outside posts, viz, 24, 27, being pivoted at their lower ends to said cross-member 28. These members 24 and 27 and their shafts 20, 23, are thus adjustable laterally toward and from the adjacent shafts 21, 22, and controlled by means of links 29 on the bearing posts, slotted to receive bolts 30 with wing nuts on the member 28. These shafts, Fig. 4, are provided at their front ends with gears 31 each in mesh with the adjacent gear and the shaft 22 carries at its end a sprocket wheel 310, over which and an idler 32 on the member 7 runs a chain 33 from a sprocket 34 on the shaft 15, and by means of which the several described shafts are rotated. The ends of shafts 20, 23, Fig. 4, are journaled in laterally elongated bearings, not shown, and held yieldingly in position by a coiled spring 230 about the shaft ends which allow them to separate under certain circumstances hereinafter mentioned.

Each shaft, Figs. 2, 3, 5, carries a roll 35 of suitable material as wood, and the rolls are each provided with a plurality of longitudinally positioned concave, ring-like fruit sizing areas 36, each succeeding area progressively from the front end being a little wider than the previous one to receive a larger apple. The rolls on shafts 20, 23, are provided on each concave or ring-like area at its Fig. 2 left hand or forward end with an angularly positioned flexible fruit feeding fin 37, as of canvas stretched over a piece of rubber, each succeeding fin progressively from the first or front one being preferably a little longer than and positioned on its shaft a little ahead circumferentially of the preceding one relative to its direction of rotation. This arrangement acts to free such sizing area of a roller of its apple before the following one can be admitted to that area.

The shafts 20 and 23 thus form between them curvilinear or oval sizing spaces 360 through which apples may fall. The outside shafts 20, 23, being provided with fruit turning and feeding fins 37 placed at a rearwardly inclined angle to the shaft, as stated, it will be evident that, as the shafts rotate, these fins will lift the fruit, turn it, and push it rearwardly toward the next fin and rear of the apparatus, i. e., to the right, Figs. 1, 2, 3.

Resting on the cross-member 10 and parallel with the member 7 is the side member 88 referred to, and the inside faces of these members 7, 88, are padded with any suitable material, as cotton 38, and covered as by canvas 39 or similar material. Substantially midway between these two side members, Fig. 4, and suspended on the member 10 at one end and an end member 59 at the opposite end, Fig. 3, is a padded V-shaped or saddle member 40, to cooperate with the members 7, 88, in safely feeding the fruit forwardly.

The hopper 41 on the table 3, Fig. 2, is preferably divided by partitions 42 into a plurality of compartments for more conveniently feeding the fruit between the pairs of rolls 20—21, 22—23. The space on table 1, Fig. 3, is divided by a plurality of upright partition members 43, 44, 45, and member 28 into a plurality of compartments 48, 49, 50, 51, preferably equal in number to the number of fruit sizing areas 36 on the shafts 20 to 23, and the container 5 is also divided by partitions 52 into corresponding and connecting chambers or bins 53, 54, 55.

At the rear, or Fig. 2, upper side, of the apparatus, Fig. 4, the member 8 has hinged to its upper edge in each compartment by, herein, a wire spring member 57, a padded fruit runway 58 on which the apples drop from between the rolls 35 and roll to the several bins 53, 54, 55, for the fruit of different sizes. At the rear or Fig. 2 right hand end of the apparatus is another bin 590 into which are fed by the flexible apron 60 secured, Fig. 2, along its outer edges to the members 7, 88, and its service edges to the pad covers 39, the large apples that do not fall between the rolls and into bins 53, 54, 55. At the forward, Fig. 3, left hand end of the table 1, at the left of partition member 43 is the compartment 48 into which are dropped the smallest apples from between the rolls at the first space 360 and the apples are guided by a flexible partition 61 into a bin 62 beneath the hopper 41.

The mode of using the apparatus is as follows:

The hopper 41 is supplied with apples and by means of the adjustable shaft supports 24, 27, for the rolls 35, the two outside rolls and shafts 20, 23, are adjusted at such distance from the two inside rolls and shafts 21, 22, as will allow the desired sizing spaces 360 between the rolls 35 to permit apples of different sizes to fall between them. Obviously the space 360 nearest the Fig. 3 left hand end of the roll will be the smallest and the succeeding spaces each progressively a little larger.

As the apples are fed from the hopper to the sorting or sizing rolls, the smallest will fall between the rolls at the first space or opening 360 and on to the apron 61, and the the balance will be fed along toward the rear or Fig. 3 right hand end by the rolls 35 and feeding fins 37, the apples falling through the proper spaces according to the size as the apples come to them. Usually the largest apples will not fall into the largest space 360, but are left to drop from the rolls 35 and to be fed by means of the flexible apron 60 to the container 59 at the extreme rear or right hand end of the apparatus, Fig. 1.

The flexible apron 60 prevents the apples from being bruised as they are fed to and along the rolls; the pads 38, 40, prevent them from being bruised as the apples are fed along over the rolls; the padded runway boards 58 provide the same protection as the apples are dropped between the rolls and the flexible fins 37 cannot injure the apples as they are fed along by them.

Should a stone or any other like article fall in the hopper from which the apples are fed, and be fed with the apples, the rolls will separate, by virtue of the elongated bearings referred to, and permit the stone to fall between them without damage to the machine.

When the machine is to be moved or shipped, the several containers 3, 5, 59, may be detached from the main table 1 for convenience.

Furthermore, the members 13, 14, carrying the shaft 15, may, by disconnecting the sprocket chain 33, be turned upward by the hinges thereon and down upon the members 11, 12, thus making the machine still more compact for handling.

My construction is preferable to a screw-threaded type of roller because in the case of the latter, the apples are fed so steadily forward that sometimes when they are a little irregular in shape they do not have a chance to fall between the rolls when they really are of an average size to do so, and would fall if a few seconds more time and one or two turns by the fin 37 gave them the opportunity.

With my construction the fins do not feed the apples forward so positively and fast but permit them to linger a few seconds before the fins lift them and turn them over and feed them forwardly. The result is that the apples are more positively and correctly sorted or sized than they would otherwise be.

Again, rollers without fins will feed a long or sharp nose apple, though small circumferentially, forward if it happens to lie lengthwise on the rolls when really it should not go, and should fall through one of the spaces. But my fins will turn such an apple over so that if it is under size in one direction or by one measurement, it will, when turned over, fall through the proper space when it is reached.

My invention is not limited to the precise embodiment thereof described and illustrated, but is more particularly pointed out in the appended claims:

Claims—

1. A fruit sizing apparatus comprising a roll supporting frame, rolls with fruit sizing areas thereon arranged relatively to each other longitudinally of the frame to provide fruit sizing spaces between the rolls, and fruit turning and feeding arcuate fins on the rolls.

2. A fruit sizing apparatus comprising a roll supporting frame, rolls with fruit sizing areas thereon arranged relatively to each other to provide fruit sizing spaces between the rolls and elongated flexible fruit turning and feeding fins on the rolls.

3. A fruit sizing apparatus comprising a roll supporting frame, rolls with fruit sizing areas thereon arranged relatively to each other to provide fruit sizing spaces between the rolls, and elongated, curvilinear, fruit turning and feeding fins rearwardly inclined on the rolls.

4. A fruit sizing apparatus comprising a roll supporting frame, rolls with fruit sizing areas thereon arranged relatively to each other to provide fruit sizing spaces between the rolls and elongated flexible fruit turning and feeding fins secured to the longitudinally curved areas on the rolls.

5. A fruit sizing apparatus comprising a roll supporting frame, rolls with fruit sizing areas of progressively increasing size thereon, the rolls yieldingly arranged relatively to each other to provide fruit sizing spaces between them, and fruit turning and feeding fins progressively and circumferentially mounted on the rolls to feed the fruit toward the rear ends of the rolls.

6. A fruit sizing apparatus comprising a roll supporting frame, rolls with fruit sizing areas of progressively increasing size thereon, the rolls yieldingly arranged relatively to each other to provide fruit sizing spaces between them, and fruit turning and feeding fins progressively and circumferentially mounted on the rolls to feed the fruit toward the rear ends of the rolls; operating means for the rolls mounted on the roll frame and means for raising and adjustably positioning said operating means to render the machine more compact for shipping.

7. Fruit sizing apparatus comprising a roll supporting frame, longitudinally extended fruit sizing and feeding rolls thereon longitudinally and angularly relatively adjustable with fruit sizing areas of longitudinally progressively larger extent, two of said rolls being supplied with curved fruit turning fins at progressively different circumferential points about the roll shafts, a flexible apron secured adjacent to and cooperatively operable with the rolls to assist in feeding the fruit forward.

In testimony whereof, I have signed my name to this specification.

CHARLES H. KAVANAGH.